(12) United States Patent
Liao

(10) Patent No.: US 7,225,042 B2
(45) Date of Patent: May 29, 2007

(54) MANUFACTURING PROCEDURE CONTROL METHOD AND SYSTEM

(75) Inventor: Yuan-Li Liao, Taichung County (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 10/954,699

(22) Filed: Sep. 30, 2004

(65) Prior Publication Data

US 2006/0074508 A1    Apr. 6, 2006

(51) Int. Cl.
*G06F 19/00* (2006.01)

(52) U.S. Cl. .......................... 700/110; 702/35

(58) Field of Classification Search ................ 700/103, 700/112, 108, 110; 702/35
See application file for complete search history.

(56) References Cited

U.S. PATENT DOCUMENTS

| | | | |
|---|---|---|---|
| 4,803,639 A * | 2/1989 | Steele et al. ................... | 702/40 |
| 5,237,510 A * | 8/1993 | Kakizawa et al. ........... | 700/214 |
| 5,500,991 A * | 3/1996 | Demarest et al. ......... | 29/407.08 |
| 5,940,303 A * | 8/1999 | Sakai et al. .................. | 324/765 |
| 6,314,332 B1 * | 11/2001 | Kida .......................... | 700/113 |
| 6,351,723 B1 | 2/2002 | Maekawa ................... | 702/185 |
| 6,563,331 B1 * | 5/2003 | Maeng ........................ | 324/760 |
| 6,783,316 B2 * | 8/2004 | Tsui et al. ................ | 414/751.1 |
| 2005/0012498 A1 * | 1/2005 | Lee et al. ................ | 324/158.1 |

FOREIGN PATENT DOCUMENTS

| | | |
|---|---|---|
| TW | 454137 | 9/2001 |
| TW | 457443 | 10/2001 |
| TW | 494328 | 7/2002 |
| TW | 571188 | 1/2004 |

OTHER PUBLICATIONS

Taiwan Office Action mailed Oct. 24, 2006.

* cited by examiner

*Primary Examiner*—Albert W. Paladini
(74) *Attorney, Agent, or Firm*—Thomas, Kayden, Horstemeyer & Risley

(57) ABSTRACT

A manufacturing procedure control method. The method executes tests during transport for object lots. The object lots are carried on a transport vehicle during transport. The object lots that pass the tests are loaded in a manufacturing tool. If a load port and a tag reader are provided on the transport vehicle, additional tests can be performed during transport of the object lots.

27 Claims, 4 Drawing Sheets

MANUFACTURING PROCEDURE CONTROL METHOD AND SYSTEM

BACKGROUND

The present invention relates to manufacturing procedure control methods, and in particular to methods and systems for testing control.

A common procedure in manufacturing object lots, such as semiconductor manufacturing materials, includes sequential steps of dispatching, transporting, testing, loading, and processing. Productivity depends on the degree of automation in manufacturing procedure control. For high-technology manufacturers, such as semiconductor manufacturers, manufacturing tools are expensive. Therefore, certain tests of object lots prior to loading in a manufacturing tool are performed to ensure that all the loaded object lots are ready for processing. For example, a MES track in check verifies if the object lots are matched with the records in a MES (Manufacturing Execution System) database. A constraint check verifies if the operating parameters of the object lots are correct.

The mentioned tests are typically time-consuming. Thus, object lots may remain idle for an excessive period of time in front of a manufacturing tool for testing, meanwhile, the manufacturing tool is idle while waiting to conduct the tests. Clearly, implementation of a continuous manufacturing procedure is a critical issue.

Some applications have been developed to improve manufacturing procedures. The disclosed applications primarily focus on manufacturing equipment. For example, U.S. Pat. No. 6,351,723 discloses a failure diagnostic method for diagnosing equipment failure based on an operating state thereof. In U.S. Pat. No. 6,351,723, operating parameters are obtained in time series and selected for calculation. A value of a deviation process capability is calculated according to the operating parameters and the failure of the equipment is determined based on the value of the deviation process capability.

The improvement seen in the manufacturing tool testing, however, cannot contribute significantly to the entire manufacturing procedure.

SUMMARY

Accordingly, an object of embodiments of the invention is to combine transport with testing of object lots to reduce idle time.

To achieve the foregoing and other objects, embodiments of the invention are directed to novel methods and systems for improving the manufacturing procedure to overcome conventional control problems. Some tests are executed during transport for object lots. The object lots are carried on a transport vehicle during transport. The object lots passing the tests are then loaded in a manufacturing tool. If a load port and a tag reader are installed on the transport vehicle, related information of the manufacturing tool can be obtained. Additionally, certain tests can be executed during transportation.

BRIEF DESCRIPTION OF THE DRAWINGS

Embodiments of the present invention can be more fully understood by reading the subsequent detailed description and examples with references made to the accompanying drawings, wherein.

DESCRIPTION

First Embodiment

Figure 1:
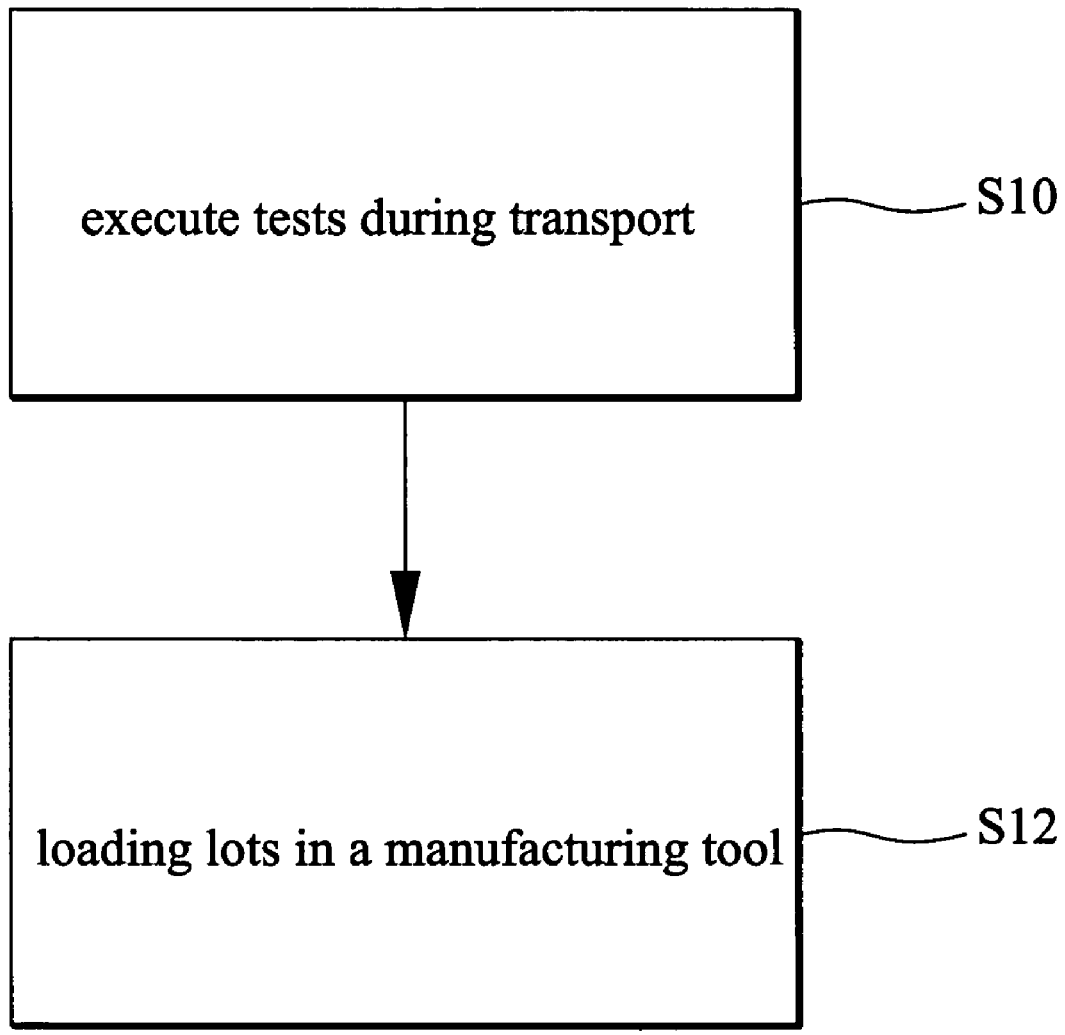
FIG. 1 is a flowchart of a first embodiment of a manufacturing procedure control method.

FIG. 1 is a flowchart of a first embodiment of a manufacturing procedure control method. In this embodiment, a manufacturing procedure control method is provided. Some tests are executed during transport of object lots (step S10). For example, for semiconductor manufacturers, the object lots may be semiconductor product lots manufacturing material. The tests include a constraint check, an EQS process check, and a recipe comparison check. The constraint check verifies the operating parameters of the object lots. The EQS process check verifies an equipment sensor for setting customized manufacturing conditions. The recipe comparison check determines if the current manufacturing conditions of a manufacturing tool are matched with the object lots. The object lots that pass the tests are then loaded in a manufacturing tool (step S12).

The object lots are carried on a transport vehicle for transport. If a load port and a tag reader are provided on the transport vehicle, the tests further include a MES track in check. The MES track in check verifies if the object lots are matched with the records in a MES database. The load port and the tag reader are commonly installed on an operating arm of a manufacturing tool to detect and obtain related information about the manufacturing tool thereon. Because the MES track in check is based on the related information, it cannot be executed during transport on the transport vehicle if a load port and a tag reader have not been installed.

During transport, some criteria are applied to select an initial time for tests. The execution of the tests can be initialized when the object lots are dispatched or when transport of the object lots begins. Additionally, the execution of the tests can be initialized to terminate the tests immediately prior to loading of the object lots in the manufacturing tool. The execution of the tests can be controlled via wired or wireless communication.

Figure 2:
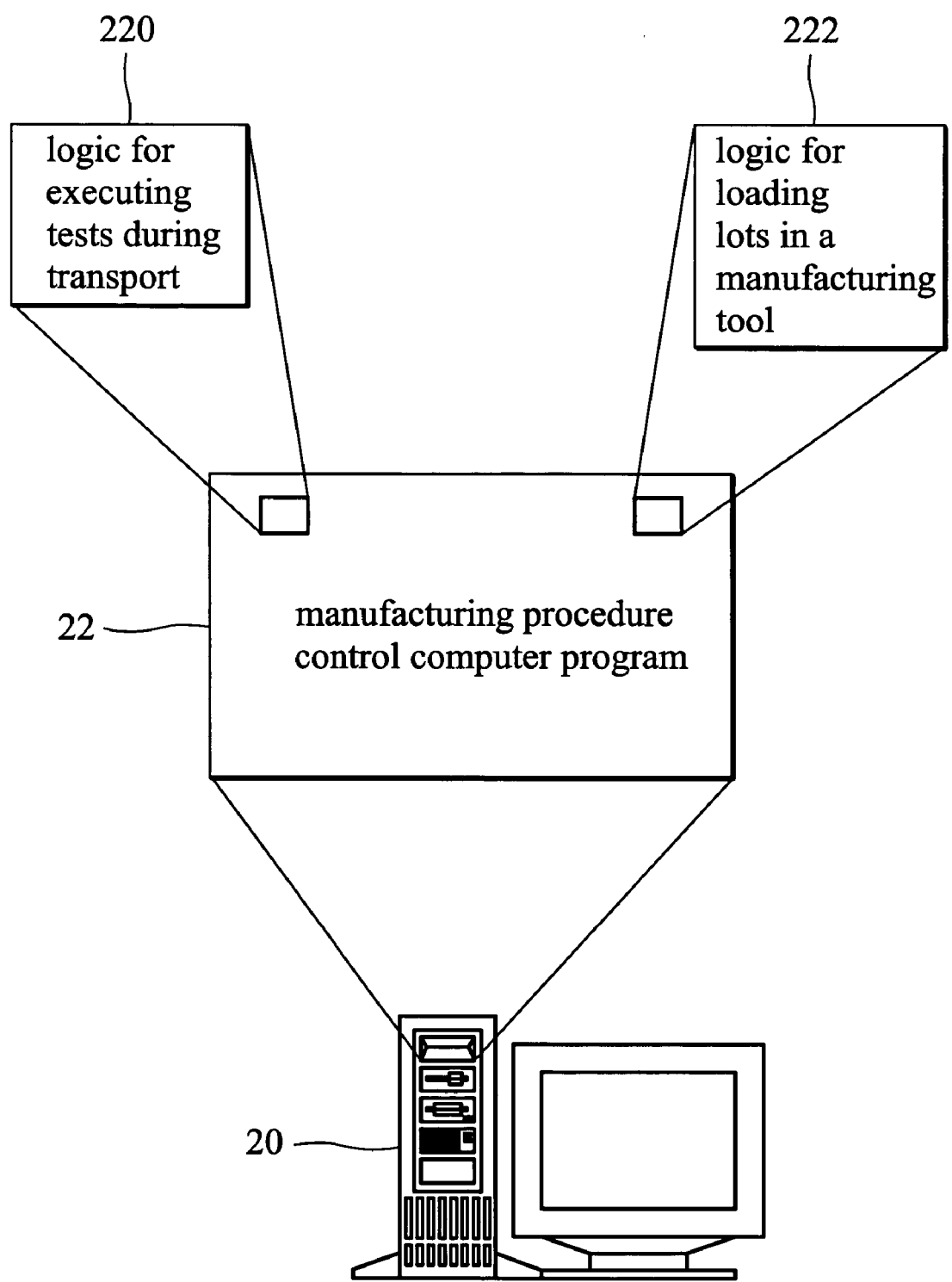
FIG. 2 is a diagram of the first embodiment of a machine-readable storage medium for storing a computer program providing a manufacturing procedure control method.

The previously described method can be implemented as computer programs. FIG. 2 is a diagram of the first embodiment of a machine-readable storage medium for storing a computer program providing a manufacturing procedure control method. In this embodiment, a machine-readable storage medium 20 for storing a computer program 22 providing a manufacturing procedure control method is disclosed. The computer program comprises logic for executing tests during transportation 220 and logic for loading object lots that pass the tests in a manufacturing tool 222.

Second Embodiment

Figure 3:
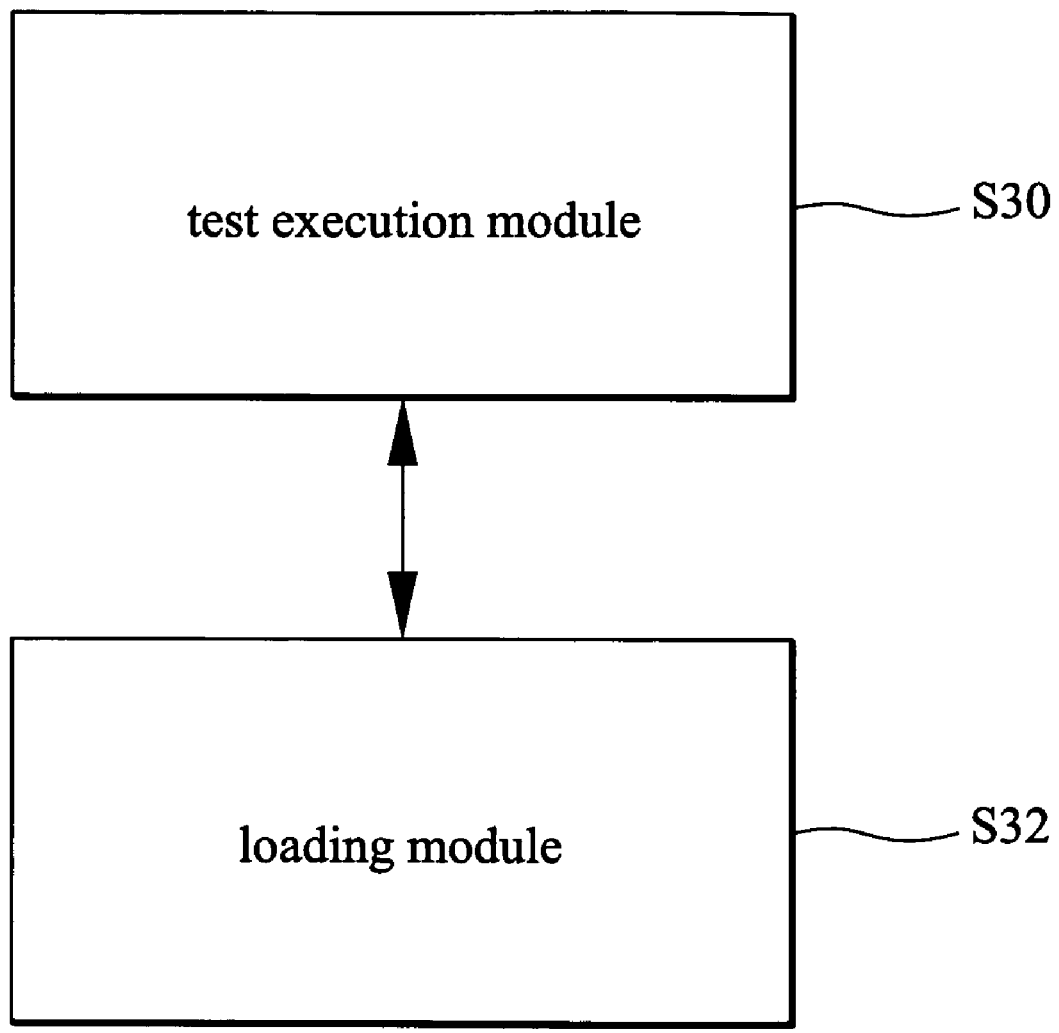
FIG. 3 is a diagram of a second embodiment of a manufacturing procedure control system.

FIG. 3 is a diagram of a second embodiment of a manufacturing procedure control system. In this embodiment, a manufacturing procedure control system comprising a test execution module 30 and a loading module 32 is disclosed. The test execution module 30 executes tests during transport for object lots, such as semiconductor product lots manufacturing material. The object lots are carried on a transport vehicle during transport. The loading module 32 loads the object lots that pass the tests in a manufacturing tool.

Here, again, the tests comprise a constraint check, an EQS process check, and a recipe comparison check. If a load port and a tag reader are provided on the transport vehicle, the tests further comprise a MES track in check.

The test execution module 30 initializes the execution of the tests when the object lots are dispatched or when transport of the object lots begins. Moreover, the test execution module 30 can initialize termination of the tests as the object lots are loaded in the manufacturing tool. Execution of the tests is controlled through wired or wireless communication.

Third Embodiment

Figure 4:
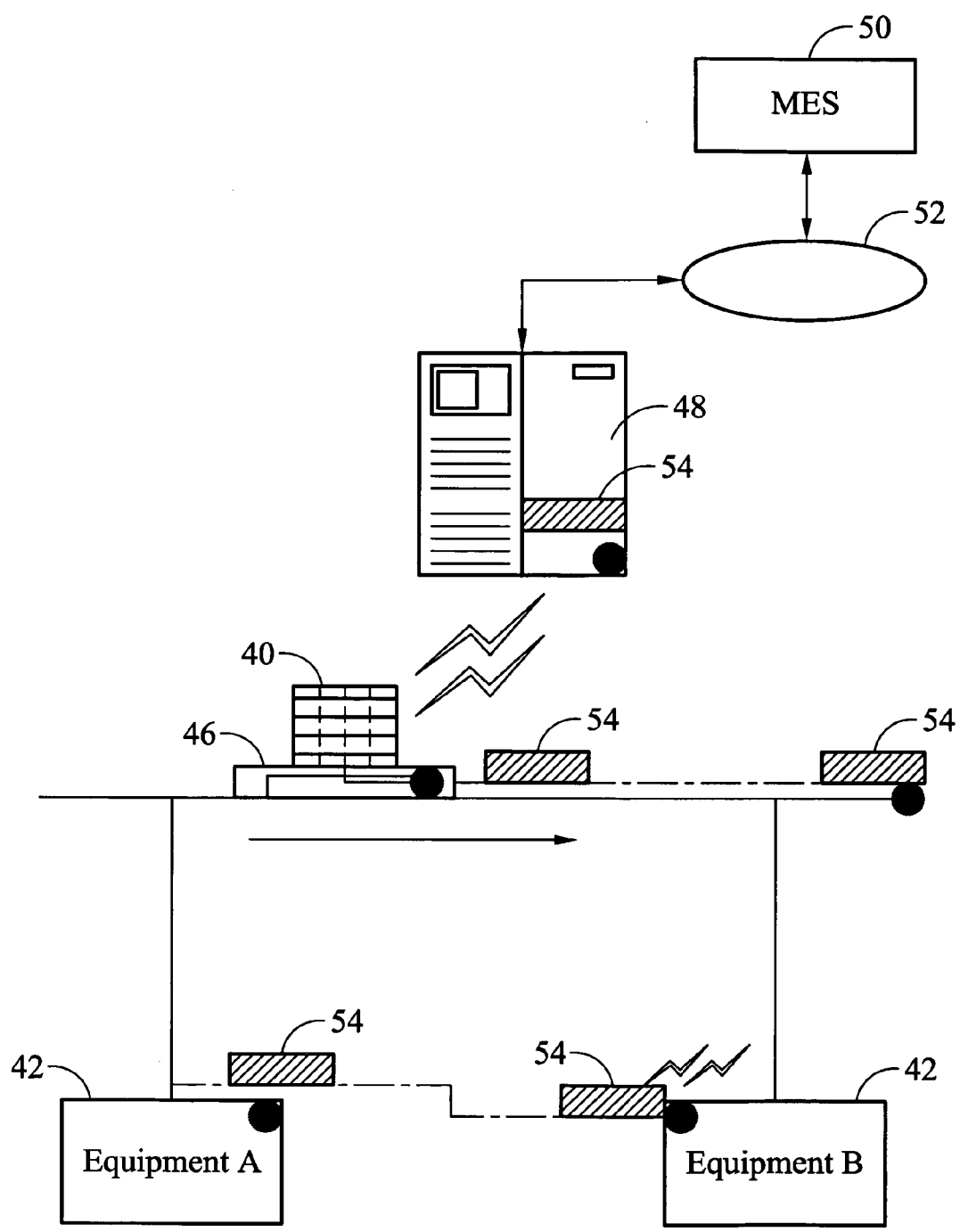
FIG. 4 is a diagram of a third embodiment of a manufacturing procedure control system.

FIG. 4 is a diagram of a third embodiment of a manufacturing procedure control system. In this embodiment, lots of semiconductor manufacturing materials 40 are transported from equipment A 42 to equipment B 44. A load port and a tag reader are installed on a transport vehicle 46. The lots 40 are loaded in the transport vehicle 46 after processing of equipment A 42. Tests for lots are executed during transport from the equipment A 42 to B 44. The tests are controlled by a general control server 48 via wireless communication. Some transmitters 54 or receivers 54 are installed for wireless communication.

The general control server 48 may refer to a MES database 50 for testing through a network 52. The MES database 50 stores related information for testing. Before the lots reach the equipment B 44, all the tests are terminated. The lots 40 can be loaded in the equipment B 44 without waiting. Because all the tests must be terminated before the lots reach the equipment B, some points in the procedure are suitable for initializing the tests. For example, the tests can be initialized when the lots 40 are dispatched or when transport of the lots 40 begins. As shown in FIG. 4, the general control server 48 can control the tests through wireless communication.

Thus, embodiments of methods and systems for manufacturing procedure control are provided. Object lots can be manufactured in a continuous procedure without waiting before a manufacturing tool for testing. The reduced testing time can increase the overall productivity.

It will be appreciated from the foregoing description that embodiments of the methods and systems described herein provide a dynamic and robust solution for control of a manufacturing procedure. If, for example, the contents of the tests or the communication method are changed, the methods and systems of the invention can be revised accordingly.

The methods and systems of the invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over a transmission medium, such as electrical wire, cable, fiberoptics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

While embodiments of the invention have been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A manufacturing procedure control method, comprising the steps of:
    executing at least one test during transport of at least one object lot, wherein the at least one object lot is carried on a carrier during transport, wherein the at least one test comprises a constraint check, an EQS process check, and a recipe comparison check;
    determining whether the at least one object lot has passed the at least one test; and
    if the at least one object lot has passed the at least one test, loading the at least one object lot in a manufacturing tool.

2. The manufacturing procedure control method of claim 1, further providing a load port and a tag reader on the carrier before execution of the tests.

3. The manufacturing procedure control method of claim 2, wherein the at least one test comprises a MES Track in check.

4. The manufacturing procedure control method of claim 1, wherein the execution of the at least one test is initialized when the at least one object lot is dispatched.

5. The manufacturing procedure control method of claim 1, wherein the execution of the at least one test is initialized when transport of the at least one object lot begins.

6. The manufacturing procedure control method of claim 1, wherein the execution of the at least one test is initialized to terminate as the at least one object lot is loaded in the manufacturing tool.

7. The manufacturing procedure control method of claim 1, wherein the execution of the at least one test is controlled via wired communication.

8. The manufacturing procedure control method of claim 1, wherein the execution of the at least one test is controlled via wireless communication.

9. The manufacturing procedure control method of claim 1, wherein the at least one object lot is a lot of semiconductor product manufacturing materials.

10. A machine-readable storage medium for storing a computer program providing a manufacturing procedure control method, the method comprising the steps of:
    executing at least one test during transport for at least one object lot, wherein the at least one object lot is carried on a carrier during transport, wherein the at least one test comprises a constraint check, an EQS process check, and a recipe comparison check;
    determining whether the at least one object lot has passed the at least one test; and
    if the at least one object lot has passed the at least one test, loading the at least one object lot in a manufacturing tool.

11. The machine-readable storage medium of claim 10, the method further providing a load port and a tag reader on the carrier before execution of the tests.

12. The machine-readable storage medium of claim 11, wherein the at least one test comprises a MES Track in check.

13. The machine-readable storage medium of claim 10, wherein the execution of the at least one test is initialized when the at least one object lot is dispatched.

14. The machine-readable storage medium of claim 10, wherein the execution of the at least one test is initialized when transport of the at least one object lot begins.

15. The machine-readable storage medium of claim 10, wherein the execution of the at least one test is initialized to terminate as the at least one object lot is loaded in the manufacturing tool.

16. The machine-readable storage medium of claim 10, wherein the execution of the at least one test is controlled via wired communication.

17. The machine-readable storage medium of claim 10, wherein the execution of the at least one test is controlled via wireless communication.

18. The machine-readable storage medium of claim 10, wherein the at least one object lot is a lot of semiconductor product manufacturing materials.

19. A manufacturing procedure control system, comprising:
 a test execution module, executing at least one test during transport of at least one object lot, wherein the at least one object lot is carried on a carrier during transport, wherein the at least one test comprises a constraint check, an EQS process check, and a recipe comparison check;
 a loading module, coupled to the test execution module and a manufacturing tool; and
 a processor determining whether the at least one object lot has passed the at least one test, and if so, directing the loading module to load the at least one object lot in the manufacturing tool.

20. The manufacturing procedure control system of claim 19, wherein a load port and a tag reader are provided on the carrier before the test execution module executes the tests.

21. The manufacturing procedure control system of claim 20, wherein the at least one test comprises a MES Track in check.

22. The manufacturing procedure control system of claim 19, wherein the test execution module initializes the execution of the at least one test when the at least one object lot is dispatched.

23. The manufacturing procedure control system of claim 19, wherein the test execution module initializes the execution of the at least one test when transport of the at least one object lot begins.

24. The manufacturing procedure control system of claim 19, wherein the test execution module initializes the at least one test to terminate as the at least one object lot is loaded in the manufacturing tool.

25. The manufacturing procedure control system of claim 19, wherein the execution of the at least one test is controlled via wired communication.

26. The manufacturing procedure control system of claim 19, wherein the execution of the at least one test is controlled via wireless communication.

27. The manufacturing procedure control system of claim 19, wherein the at least one object lot is a lot of semiconductor product manufacturing materials.

* * * * *